United States Patent
Ernst et al.

(10) Patent No.: US 9,822,005 B2
(45) Date of Patent: Nov. 21, 2017

(54) DEVICE FOR CREATING OXYGEN

(71) Applicant: B/E Aerospace Systems GmbH, Lübeck (DE)

(72) Inventors: Rainer Ernst, Stockelsdorf (DE); Gerald Maroske, Lübeck (DE)

(73) Assignee: B/E Aerospace Systems GmbH, Lubeck (DE)

( * ) Notice: Subject to any disclaimer, the term of this patent is extended or adjusted under 35 U.S.C. 154(b) by 0 days.

(21) Appl. No.: 14/978,326

(22) Filed: Dec. 22, 2015

(65) Prior Publication Data
US 2016/0194203 A1    Jul. 7, 2016

(30) Foreign Application Priority Data
Jan. 7, 2015    (DE) .................. 10 2015 200 062

(51) Int. Cl.
| | | |
|---|---|---|
| *A62B 7/08* | (2006.01) | |
| *B01J 8/00* | (2006.01) | |
| *C01B 13/02* | (2006.01) | |
| *A62B 21/00* | (2006.01) | |
| *A62B 7/14* | (2006.01) | |

(52) U.S. Cl.
CPC .......... *C01B 13/0218* (2013.01); *A62B 21/00* (2013.01); *A62B 7/14* (2013.01)

(58) Field of Classification Search
CPC .............................. C01B 13/0218; B01J 19/24
USPC .................................................. 422/120, 600
See application file for complete search history.

(56) References Cited

U.S. PATENT DOCUMENTS

| | | | | |
|---|---|---|---|---|
| 3,542,522 A | * | 11/1970 | Mausteller | C01B 13/0296 422/122 |
| 4,623,520 A | * | 11/1986 | Robinet | C01B 13/0296 128/202.26 |
| 4,891,189 A | * | 1/1990 | Harwood, Jr. | B01J 7/00 102/530 |
| 5,772,976 A | * | 6/1998 | Cortellucci | A62B 21/00 423/579 |
| 7,494,624 B2 | | 2/2009 | Crudace et al. | |
| 2004/0151639 A1 | | 8/2004 | Jones et al. | |

* cited by examiner

*Primary Examiner* — Kevin Joyner
(74) *Attorney, Agent, or Firm* — Donna Suchy

(57) ABSTRACT

The invention relates to a device (1) for producing oxygen by means of a chemical reaction, in particular by means of an exothermic chemical reaction, wherein the device (1) comprises a chemical core (2), in which a substance producing oxygen by way of chemical reaction is present, and the chemical core (2) comprises a first reaction body (3) and a second reaction body (4) which are arranged in a manner such that they can be simultaneously activated, so that a first reaction front (13) propagates in the first reaction body (3) and simultaneously a second reaction front (14) propagates in the second reaction body (4).

14 Claims, 2 Drawing Sheets

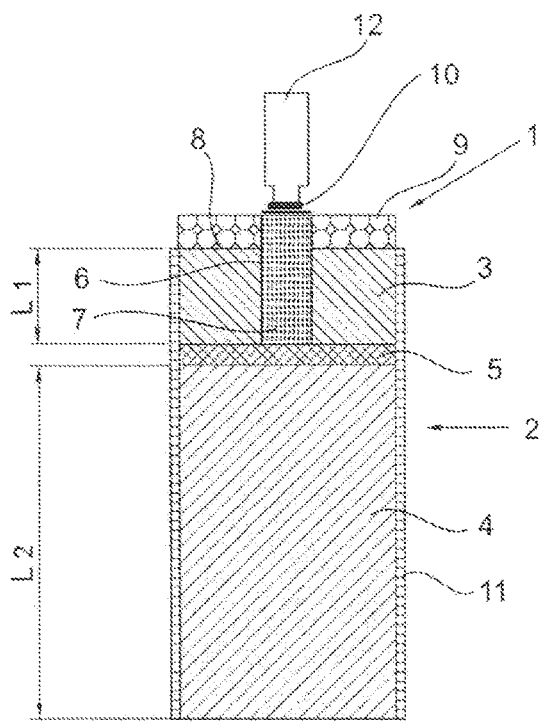
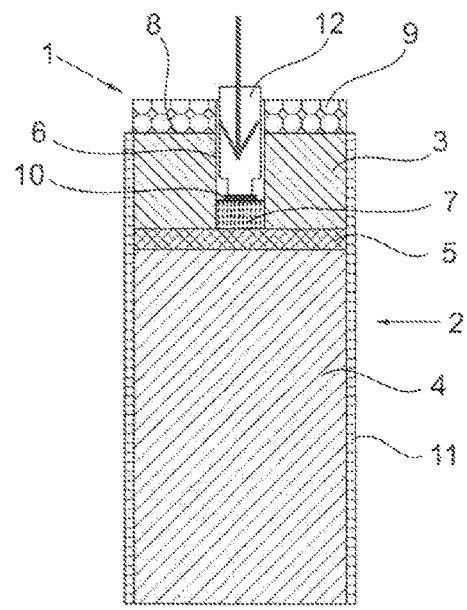
Fig. 1
Fig. 2
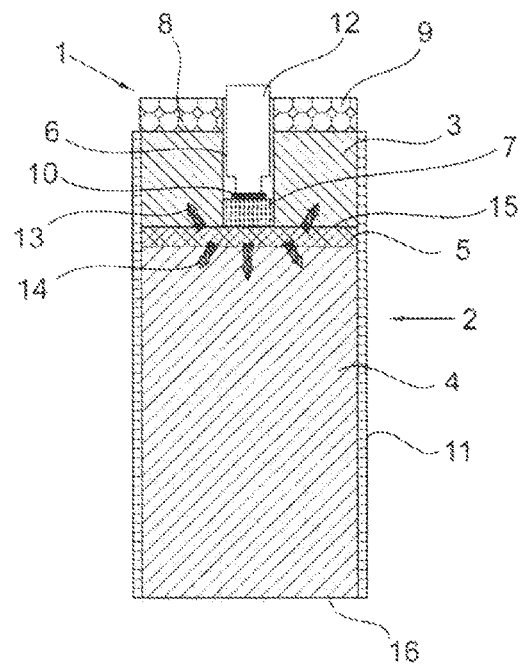
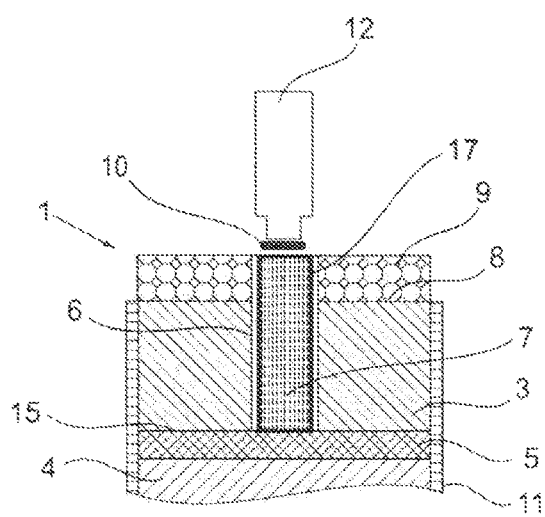
Fig. 3
Fig. 4

DEVICE FOR CREATING OXYGEN

CROSS-REFERENCES TO RELATED APPLICATIONS

This application claims priority from German Patent Application No. 10 2015 200 062.1, filed Jan. 7, 2015 incorporated by reference in its entirety.

BACKGROUND

The invention relates to a device for producing oxygen by means of a chemical reaction, according to the preamble of claim 1.

Aircraft in civil aviation as well as in the military field are usually equipped with an emergency system for the supply of oxygen during a pressure drop in the cabin.

A pressure which, compared to the pressure on the ground, is reduced by roughly a quarter prevails in the aircraft cabin, i.e. the cabin pressure is artificially held at three-quarters of the atmospheric pressure at sea level, i.e. approx 750 hPa, during the cruising phase, i.e. the phase between take-off and landing and in which the aircraft has reached its cruising altitude of about 10000 m. However, a pressure of roughly a quarter of the inner pressure of the cabin prevails outside the aircraft at an altitude of 10000 m. A pressure drop in the cabin of the aircraft can occur if the pressure in the cabin suddenly drops, for example due to a defect in the outer skin of the aircraft. Oxygen masks fall from the panelling above the seats, in order to supply passengers with sufficient oxygen in such situations. These oxygen masks are usually supplied with chemically produced oxygen. For this, chemical oxygen generators are provided above the seats, in which generators a continuous chemical reaction takes place, triggered by a thermal ignition, e.g. by a pull on the oxygen mask, by way of which reaction oxygen is produced and is released to the masks in a defined manner.

A device for producing oxygen by way of a thermal decomposition of a chemical located in a cartridge housing is known for example from DE 44 37 895 C1. There, departing from an activation location, oxygen is produced in a more or less uniform manner along a reaction front propagating in the interior of the cartridge housing in the direction of an unconsumed chemical, until the chemical located in the cartridge is consumed.

If an emergency situation as is described above occurs, a descent is immediately initiated by the pilots, in order to reach an altitude, at which pressure conditions permitting a normal breathing without additional supply of oxygen again prevail. An increased oxygen demand therefore exists in the first minutes in particular during the descent phase, whereas only a reduced oxygen supply is necessary with the continued flight at the reduced altitude (holding altitude) which is subsequent to the descent.

In the state of the art, it is known on the one hand to additionally provide a flow controller, in order to provide a [closed-loop] control of the oxygen supply, wherein this is quite expensive. On the other hand, it is also known from the state of the art, to achieve a changing oxygen production rate and thus supply rate by way of adapting the cross section of the chemical core, in which the reaction takes place. This for example can be effected by way of the thickness of the core being designed in a manner increasing or decreasing over the length, over which the reaction front propagates. However, with these solutions known from the state of the art, there is the disadvantage that the core must have a non-uniform geometry, which can compromise the mechanical stability of such a device producing oxygen.

From US 2004/0151639 A1 and U.S. Pat. No. 7,494,624 B2, it is counted as belonging to the state of the art, with a chemical oxygen generator, not to provide the activation location at the end of the chemical core, but on its side or middle, so that the reaction front propagates in different, in particular opposite directions, by which means the oxygen is produced in a shorter time than is the case with reaction cores ignited at one side.

SUMMARY OF THE INVENTION

Against this background, it is the object of the present invention, to provide a device for producing oxygen by means of a chemical reaction, which at least partly overcomes the problems of the state of the art which have been described above. In particular, a device is to be provided, which on the one hand is economical and which on the other hand ensures the necessary supply in an adapted manner.

This object is achieved by a device for producing oxygen by means of a chemical reaction, with the features according to claim 1. Advantageous further developments of the invention are defined in the dependent claims. Thereby, the features specified in the dependent claims and the description, in each case per se, but also in a suitable combination further form the solution according to the invention and according to claim 1.

According to the invention, a device for producing oxygen by means of a chemical reaction, in particular by means of an exothermic, chemical reaction is accordingly provided, wherein the device comprises a chemical core, in which a substance producing oxygen by way of chemical reaction is present, and wherein the chemical core comprises a first reaction body and a second reaction body which are arranged in a manner such that they can be simultaneously activated, so that a first reaction front propagates in the first reaction body and simultaneously a second reaction front propagates in the second reaction body. Since two reactions producing oxygen can be simultaneously started by way of this, the increased oxygen demand which is particularly initially required during the descent can be covered by way of the configuration according to the invention. It is the case of a simple construction, since the core can be homogeneously constructed and does not need to contain constituents of higher and lower reactivities, as with the state of the art. No additional regulation mechanisms are necessary, by which means the construction is very inexpensive and robust. The required stability of the construction can also be ensured by way of the configuration according to the invention, since a variable cross section, for example with a greater thickness of the core at the end where the reaction is triggered and started and which then reduces over the length of the core, can be avoided.

According to the invention, the first reaction body is arranged next to the second reaction body, and in the installed condition, preferably above the second reaction body, wherein an ignition plate is arranged between the first and the second reaction body. This configuration on the one hand is space-saving and on the other hand by way of this, it is rendered possible, departing from the ignition plate arranged between the two reaction bodies, to simultaneously start the parallel reaction in both reaction bodies simultaneously by way of only a single ignition mechanism. Moreover, the arrangement of both reaction bodies next to one another or above one another provides an increased stability due to the uniform geometry resulting therefrom, in particular in the case of an identical cross section of both reaction bodies.

According to the invention, the first reaction body and the second reaction body have lengths which are different to one another. In particular, the first reaction body can have a shorter length than the second reaction body. The length of the first reaction body can preferably be adapted, in order correspond to the duration of the descent. I.e., the reaction in the first reaction body and in the second reaction body takes place for as long as the descent lasts. When the chemical substance in the first reaction body is then consumed, an oxygen production then only continues to be effected by way of the second reaction body, which then alone can cover the lower oxygen requirement during the holding phase.

Thereby, the first reaction body and the second reaction body envisage a different reaction duration for the production of oxygen due to their different length. Thus, as already described above, e.g. more than double the amount of oxygen can be provided during the duration of the descent, than during the subsequent holding phase at an altitude, at which a normal breathing without the additional oxygen supply is not yet possible.

According to the invention, a continuous opening, in particular a central through-bore, in which a starting means, in particular a starting powder or ignition powder is arranged, is provided in the first a or in the second reaction body. In contrast to the otherwise common starting at the upper side of a reaction body, a parallel starting of a reaction bodies by way of only one starting mechanism is possible by way of this configuration, in order to thus provide an increased oxygen quantity, in particular over the time period a descent.

It is also advantageous if the first reaction body, the second reaction body and the ignition plate are arranged in a carrier of expanded metal or metal foil.

The first reaction body can be provided with a continuous opening, wherein an upper outer end surface of the first reaction body which lies opposite an inner end surface of the first reaction body which contacts the ignition plate, is covered with an insulation means, in particular with a ceramic insulation. This protects the direct environment from being negatively affected by the chemical reaction for producing oxygen. The covering by way of a ceramic insulation is very advantageous, in particular, in light of the fact that it is hereby the case of an exothermic reaction, with which much heat is released.

The device is preferably designed in a manner such that the first reaction front in the first reaction body, departing from the ignition plate propagates to the upper outer end surface of the first reaction body, and the second reaction front in the second reaction body, departing from the ignition plate, propagates in the opposite direction to the first reaction front, to an outer end surface of the second reaction body. Thus a parallel production of oxygen takes place, which covers the additional oxygen demand during the initial descent phase in the case of an emergency.

According to a further preferred embodiment, the first reaction body and the second reaction body are formed from the same material, in particular of sodium chlorate. The use of identical reaction materials in both reaction bodies is particularly advantageous with regard to the ignition or the starting behaviour.

The continuous opening can be advantageously lined with a sheet metal, by which means, on initiating the ignition, it is ensured that the reaction front in the first reaction body, in which the opening with the starting mechanism is located, takes a defined path and cannot propagate along the inner wall of the opening. The starting mechanism can also be arranged in the continuous opening, in order to shorten the length of the chemical oxygen generators.

BRIEF DESCRIPTION OF THE DRAWINGS

The invention is hereinafter described in more detail by way of an embodiment example which is represented in the drawing. There are shown in:

FIG. 1 a sectioned view through a device for producing oxygen, according to an embodiment of the invention, in the installed condition;

FIG. 2 a sectioned view through the device for producing oxygen, with a starting mechanism which is arranged therein, according to a further embodiment of the invention, in the installed condition;

FIG. 3 a further sectioned view through the device which is represented in FIG. 2, with the two reaction directions which are represented by way of arrows, FIG. 4 a sectioned view as in FIG. 1, but with the bore which is lined by a sheet metal and FIG. 5 a diagram which represents the produced oxygen quantity of the device, in dependence on time.

DETAILED DESCRIPTION OF THE PREFERRED EMBODIMENTS

Figure 5:
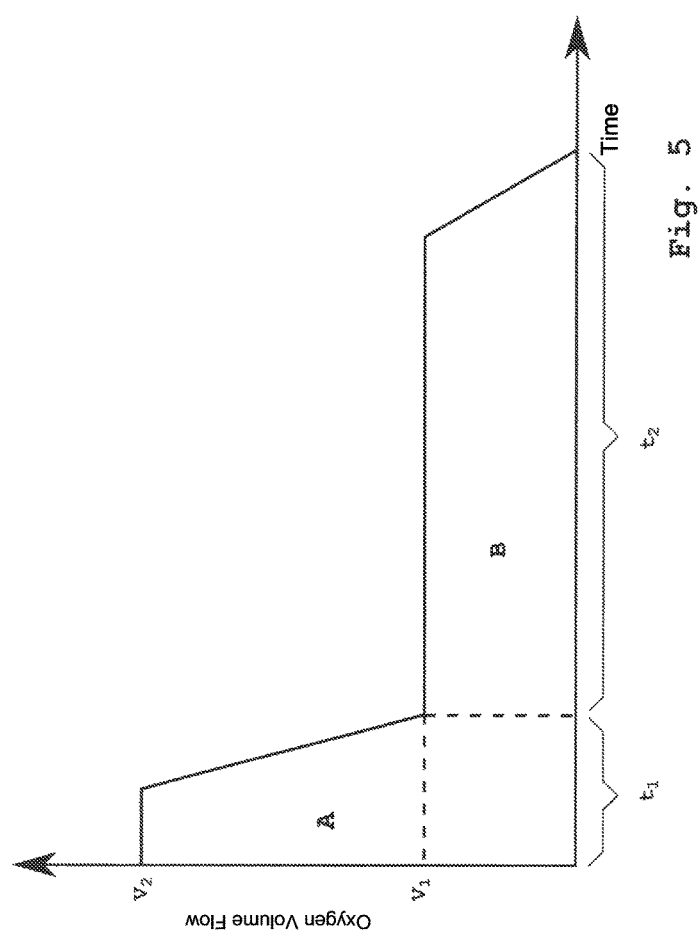

FIG. 1 is a sectioned view through a device 1 for producing oxygen according to an embodiment of the invention, which can be applied for example as a so-called chemical passenger oxygen generator in an aircraft. The device comprises a core 2 with a substance which produces oxygen and which in the embodiment described here consists essentially of sodium chlorate ($NaClO_3$). Oxygen can be produced by way of the device 1, by the following chemical reaction which takes place exothermically:

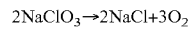

$$2NaClO_3 \rightarrow 2NaCl + 3O_2$$

A different equivalent chlorate or perchlorate, for example lithium perchlorate ($LiClO_4$) can also be alternatively used as a substance producing oxygen.

The chemical core 2 is essentially constructed from a first reaction body 3 and of a second reaction body 4, and these are arranged above one another and between which an ignition plate 5 is arranged. As can be recognised in the figure, the upper first reaction body 3 is designed in a significantly smaller manner than the second reaction body 4 which is to say has a significantly shorter length $L_1$ than the length $L_2$ of the second reaction body 4. The cross section of both reaction bodies 3, 4 however is identical, so that together with the ignition plate 5 arranged therebetween they form a uniform geometry in the of shape of a cylinder. This design provides the device 1 with very good characteristics with regard to its mechanical stability.

A central, continuous opening 6 which penetrates the first reaction body 3 along its longitudinal axis and leads to the ignition plate 5 is provided in the upper first reaction body 3. The opening 6 serves for the filling with a powder-like starter filling, which is to say an ignition powder 7 for the ignition mechanism (see FIG. 2) which can be ignited by way of a starting device in the form of an ignition cap 10.

Moreover, a ceramic insulation 9 completely covering the outer upper end surface 8 of the first reaction body 3 which lies opposite an inner end surface 15 of the first reaction body 3 which contacts the ignition plate 5, and through which insulation the opening 6 also penetrates, is provided on the upper side 8 of the first reaction body 3.

FIG. 2 is a sectioned view through a device 1 for producing oxygen with an ignition mechanism which is arranged therein, according to a further embodiment of the invention. Here, just as in the embodiment represented in FIG. 1, the first reaction body 3, the second reaction body 4 and the ignition plate 5 arranged therebetween are surrounded by a carrier 11 or a housing 11 of expanded metal. The carrier 11 can alternatively consist of metal foil. This serves for the mechanical and thermal stabilisation of the device 1. The opening 6 is filled with ignition powder 7. The ignition mechanism is triggered by way of impacting an impact starter 12 onto the ignition cap 10 and the ignition powder 7, in the direction characterised by arrow and being transmitted via the ignition plate 5 onto the first reaction body 3 and the second reaction body 4, for igniting the chemical core 2, as is explained in more detail in connection with FIG. 3. With regard to the embodiment according to FIG. 2, the impact starter 12 with the ignition cap 10 is almost completely integrated within the cylindrical opening 6, and here too, the ignition powder 7 is also arranged between the ignition cap 10 and the ignition plate 5, but in comparison to the embodiment variant represented in FIG. 1 has a significantly shorter path, i.e. the height of the cylindrical space, in which the ignition powder 7 is arranged, is significantly smaller with the embodiment according to FIG. 2 than with the embodiment according to FIG. 1. This has the advantage that the propagation of the reaction fronts is effected in a more directed manner, as is represented by way of FIG. 3 by the arrows 13 and 14.

FIG. 3 is a further sectioned view through the device 1 represented in FIG. 1. On triggering the ignition by way of the starting mechanism described above, a first reaction front 13 propagates in the first reaction body 3, and a second reaction front 14 simultaneously propagates in the second reaction body 4, as is indicted by the black arrows. The first reaction front 13 thereby departing from the ignition plate 5 propagates to the upper outer end surface 8 of the first reaction body 3. The second reaction front 14 propagates simultaneously, departing from the ignition plate 5, in the opposite direction to the lower outer end surface 16 of the second reaction body 4. After triggering the exothermic chemical reaction by way of a starting mechanism, the oxygen production is effected in two phases on account of the different lengths $L_1$ and $L_2$ of the first and the second reaction bodies 3, 4. Depending on the design, up to more than double the quantity $V_2$ of oxygen is produced in the first phase $t_1$, in which oxygen is produced in the first reaction body 3 as well as in the second reaction body 4, than in the second phase $t_2$, in which the first reaction front 13 has reached the upper outer end surface 8 of the first reaction body 3, which leads to an end of the oxygen production in the first reaction body 3, and oxygen only being produced in the second reaction body 4. Since this has a significantly greater length $L_2$ than the first reaction body 3, here oxygen can continue to be produced over a long time period, but then as a whole at a lower quantity $V_1$, as is evident from FIG. 5. A greater oxygen requirement in the aircraft can be thus be covered in the first phase, for example with a descent carried out in the case of an emergency, and then only a suitably lower quantity of oxygen is produced in the second phase, for example in the holding phase at an altitude, in which breathing is possible with little additional oxygen.

A regulation (closed-loop control) of the oxygen supply is thus possible without complicated control devices, and the device according to the invention simultaneously has a good stability due to its uniform geometry.

With the embodiment variant which is represented by way of FIG. 4, the cylindrical space which is formed by the opening 6 comprises a tubular sheet metal lining 17 which separates the starter filling from the surrounding first reaction body 3. This lining 17 on the one hand ensures that the ignition plate 5 is brought into the ignition reaction via the ignition powder 7 after triggering the starting device, whereupon the reaction fronts 13 and 14, as are represented in FIG. 3, propagate almost simultaneously and in the opposite direction. The sheet lining 17 moreover has the advantage that material is prevented from falling from the first reaction body 3 into the opening 6 on filling the ignition powder 7, whereby this material could lead to a worsening of the transition from the ignition power 7 to the ignition plate 7. It is to be understood that such a sheet metal lining 17 could also be advantageously applied with the embodiment according to FIG. 2.

LIST OF REFERENCE NUMERALS

1 device for producing oxygen
2 core
3 first reaction body with length L1
4 second reaction body with length L2
5 ignition plate
6 opening
7 starter filling
8 (upper) outer end surface of the first reaction body
9 ceramic insulation
10 ignition cap
11 carrier
12 impact starter
13 first reaction front
14 second reaction front
15 (lower) inner end surface of the second reaction body
16 (lower) outer end surface of the second reaction body
17 sheet metal lining

We claim:

1. A device for producing oxygen by means of an exothermic chemical reaction, wherein the device comprises a chemical core, in which a substance producing oxygen by way of chemical reaction is present, and the chemical core comprises a first reaction body and a second reaction body which are arranged in a manner such that they can be simultaneously activated, so that a first reaction front propagates in the first reaction body and simultaneously a second reaction front propagates in the second reaction body, wherein the first reaction body is separated from the second reaction body by an ignition plate located between said first reaction body and said second reaction body; wherein the first reaction body and the second reaction body have lengths LI, 12 which are different to one another, and based on their different lengths provide a different reaction duration for the production of oxygen, and that a continuous opening, in which a starting means is arranged, is provided in the first reaction body or in the second reaction body.

2. A device according to claim 1, wherein the first reaction body is arranged above the second reaction body in the installed condition.

3. A device according to claim 1, wherein the continuous opening in the first reaction body or in the second reaction body is a central through-bore.

4. A device according to claim 1, wherein the starting means is an ignition powder.

5. A device according to claim 1, wherein the first reaction body, the second reaction body and the ignition plate are arranged in a carrier of expanded metal or metal foil.

6. A device according to claim 1, wherein the first reaction body is provided with the continuous opening, wherein an upper outer end surface of the first reaction body which lies opposite an inner end surface of the first reaction body which contacts the ignition plate, is covered with insulation.

7. A device according to claim 6, wherein the first reaction front in the first reaction body, departing from the ignition plate propagates to the upper, outer end surface of the first reaction body, and the second reaction front in the second reaction body, departing from the ignition plate propagates in the opposite direction to the first reaction front, to an outer end surface of the second reaction body.

8. A device according to claim 1, wherein the first reaction body and the second reaction body are formed from the same material.

9. A device according to claim 1, wherein the continuous opening is lined with a sheet metal.

10. A device according to claim 1, wherein a starting mechanism is arranged in the opening in a sunk manner.

11. A device according to claim 1, wherein the first reaction body is provided with the continuous opening, wherein an upper outer end surface of the first reaction body which lies opposite an inner end surface of the first reaction body which contacts the ignition plate, is covered with a ceramic insulation.

12. A device according to claim 1, wherein the first reaction body and the second reaction body are formed from sodium chlorate.

13. A device according to claim 1, wherein an impact starter is arranged in the opening in a sunk manner.

14. A device for producing oxygen by an exothermic chemical reaction; wherein the device comprises:
    a chemical core containing a material for chemically generating oxygen positioned in a first cylindrical reaction body having a first length, and a second cylindrical reaction body coaxial with, and the same diameter as, the first reaction body and having a second length that is different than the first length, wherein said first reaction body and said second reaction body are joined at a common boundary defined by a single ignition plate;
    an opening containing an ignition starter provided in one or the other of the first reaction body and the second reaction body; and
    whereby upon ignition a first reaction front propagates in the first reaction body and a second reaction front simultaneously propagates in the second reaction body the first and second lengths of the respective first and second reaction bodies each providing a different oxygen production duration that prolongs the total oxygen generation time of the device.

* * * * *